US012806747B2

(12) United States Patent
Albrecht et al.

(10) Patent No.: US 12,806,747 B2
(45) Date of Patent: Nov. 24, 2026

(54) TOOL BIT RETAINER WITH DEFORMABLE RING

(71) Applicant: MILWAUKEE ELECTRIC TOOL CORPORATION, Brookfield, WI (US)

(72) Inventors: Devin C. Albrecht, Hartford, WI (US); Hugh A. Dales, Germantown, WI (US); Jay M. Klubertanz, Hartford, WI (US); Jeffery M. Watts, Milwaukee, WI (US); Troy C. Thorson, Cedarburg, WI (US); Zhipeng Dai, Dongguan City (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 525 days.

(21) Appl. No.: 18/340,668

(22) Filed: Jun. 23, 2023

(65) Prior Publication Data

US 2024/0001518 A1 Jan. 4, 2024

(30) Foreign Application Priority Data

Jul. 4, 2022 (CN) ......................... 202221715665.7

(51) Int. Cl.

*B25D 17/08* (2006.01)
*B25B 21/02* (2006.01)
*B25B 23/00* (2006.01)

(52) U.S. Cl.

CPC .......... *B25B 23/0035* (2013.01); *B25B 21/02* (2013.01)

(58) Field of Classification Search

CPC ............ B23B 31/1071; B23B 2231/58; B23B 31/107; Y10T 279/17145; Y10T 279/17196; Y10T 279/17752; Y10S 279/905; Y10S 279/906; B25D 17/005; B25D 17/088; B25D 2250/321; B25D 2250/345

See application file for complete search history.

(56) References Cited

U.S. PATENT DOCUMENTS

| | | | |
|---|---|---|---|
| 6,302,408 B1 | 10/2001 | Zierpka | |
| 7,654,779 B2 | 2/2010 | Sasaki et al. | |
| 8,672,331 B2 | 3/2014 | Braun et al. | |
| 2010/0176561 A1* | 7/2010 | Braun .................. | B25D 17/088 279/82 |

FOREIGN PATENT DOCUMENTS

| | | |
|---|---|---|
| DE | 102007060084 A1 | 6/2009 |
| DE | 102014119685 A1 | 6/2016 |
| EP | 3838438 A1 | 6/2021 |
| WO | 2006061789 A1 | 6/2006 |

* cited by examiner

*Primary Examiner* — Alan Snyder
(74) *Attorney, Agent, or Firm* — Michael Best & Friedrich LLP

(57) ABSTRACT

A tool comprises a housing, an electric motor positioned in the housing, and a drive assembly including an output shaft having a driving end portion. The output shaft extends from the housing such that a tool element for performing work on a workpiece is attachable to the output shaft. A retainer assembly is positioned about an outer surface of the driving end portion. The retainer assembly has a proximal end adjacent to the housing. A deformable retainer ring includes a flexible non-metal material and is positioned about an outer surface of the output shaft between an outer surface of the driving end portion and an interior surface at the proximal end of the retainer assembly.

18 Claims, 6 Drawing Sheets

TOOL BIT RETAINER WITH DEFORMABLE RING

BACKGROUND

The present invention relates to impact tools, and, more particularly, impact tools including a deformable retainer ring replacement for an anvil spring.

Impact tools, such as impact wrenches, provide a striking rotational force, or intermittent applications of torque, to a tool element or workpiece (e.g., a fastener) to either tighten or loosen the fastener. Impact wrenches are typically used where high torque is needed, such as to tighten relatively large fasteners or to loosen or remove stuck fasteners (e.g., an automobile lug nut on an axle stud) that are otherwise not removable or very difficult to remove using hand tools.

Impact tools with quick-connect retainer assemblies include an anvil having an anvil spring. When a tool bit is inserted into an anvil, the anvil spring deforms to allow ball detents supported by the anvil to move out of their slots to make way for the shank of a tool bit. Anvil springs may be susceptible to corrosion and failure in certain environments.

SUMMARY

According to one aspect of the present disclosure, a tool comprises a housing, an electric motor positioned in the housing, and a drive assembly including an output shaft having a driving end portion. The output shaft extends from the housing such that a tool element for performing work on a workpiece is attachable to the output shaft. A retainer assembly is positioned about an outer surface of the driving end portion. The retainer assembly has a proximal end adjacent to the housing. A deformable retainer ring includes a flexible non-metal material and is positioned about an outer surface of the output shaft between an outer surface of the driving end portion and an interior surface at the proximal end of the retainer assembly.

According to further aspects of the tool, the deformable retainer ring includes one or more deformable wings having ball detent seats for supporting ball detents. In some aspects, the ball detent seats on the one or more deformable retainer springs allow the insertion and release of the tool element when the one or more deformable wings are in a deformed state. In some aspects, the ball detent seats on the deformable retainer spring allow the retention of an inserted tool element when at least one of the one or more deformable wings is in a non-deformed state.

According to further aspects of the tool, the flexible non-metal material is rubber. In some aspects, the output shaft is an anvil including a body rotatable about a longitudinal axis. In some aspects, the driving end portion includes a drive bore extending from the anvil along a longitudinal axis of the tool. In some aspects, the drive bore is configured to receive the tool element. In some aspects, the ball detent seats allow ball detents to be positioned within one or more transverse bores adjacent the drive bore in the driving end portion. The one or more transverse bores penetrate a side wall of the anvil.

According to further aspects of the tool, the retainer assembly is a sleeve movable along a longitudinal axis of the tool.

According to further aspects of the tool, the tool is an impact driver and the drive assembly is configured to convert a continuous rotational input from the electric motor to intermittent applications of torque to the output shaft. The drive assembly includes a camshaft driven by the electric motor and a hammer configured to reciprocate along the camshaft.

According to another aspect of the present disclosure, a deformable retainer ring for an impact power tool includes an anvil with a drive end portion. The deformable retainer ring comprises a ring structure formed from a flexible non-metal material. The ring structure has an inner diameter configured to allow the ring structure to be positioned about an outer surface of the drive end portion of the anvil. One or more deformable wings are positioned along the circumference of the ring structure. One or more ball detent seats are positioned along the circumference of the ring structure for receiving one or more corresponding ball detents.

According to further aspects of the deformable retainer ring, the ring structure is configured to be positioned between the outer surface of the driving end portion and an interior surface of a proximal end of a tool bit retainer sleeve. In some aspects, at least one of the one or more ball detent seats protrude inwardly toward a center of the ring structure. In some aspects, at least one of the one or more ball detent seats protrude inwardly through respective transverse perimeter slots into the side walls of the anvil when the ring structure is positioned about the outer surface of the drive end portion.

According to further aspects of the deformable retainer ring, the one or more ball detent seats include cup-shaped recesses. In some aspects, the ring structure includes an elastomer material.

According to further aspects of the deformable retainer ring, at least one of the one or more deformable wings has a reduced thickness relative to the thickness of the remaining portions of the ring structure. The reduced thickness allows the one or more deformable wings to pivot about the main body of the ring structure. In some aspects, reduced thickness of the at least one of the one or more deformable wings includes an outer surface of the retainer ring tapering inwardly at an oblique angle from the front side of the ring structure toward a rear side of the ring structure.

According to further aspects of the deformable retainer ring, the one or more ball detent seats includes at least two ball detent seats, the at least two ball detent seats being evenly positioned about a perimeter of the ring structure.

Additional features and aspects of the disclosure will become apparent by consideration of the following detailed description and accompanying drawings.

Figure 1:
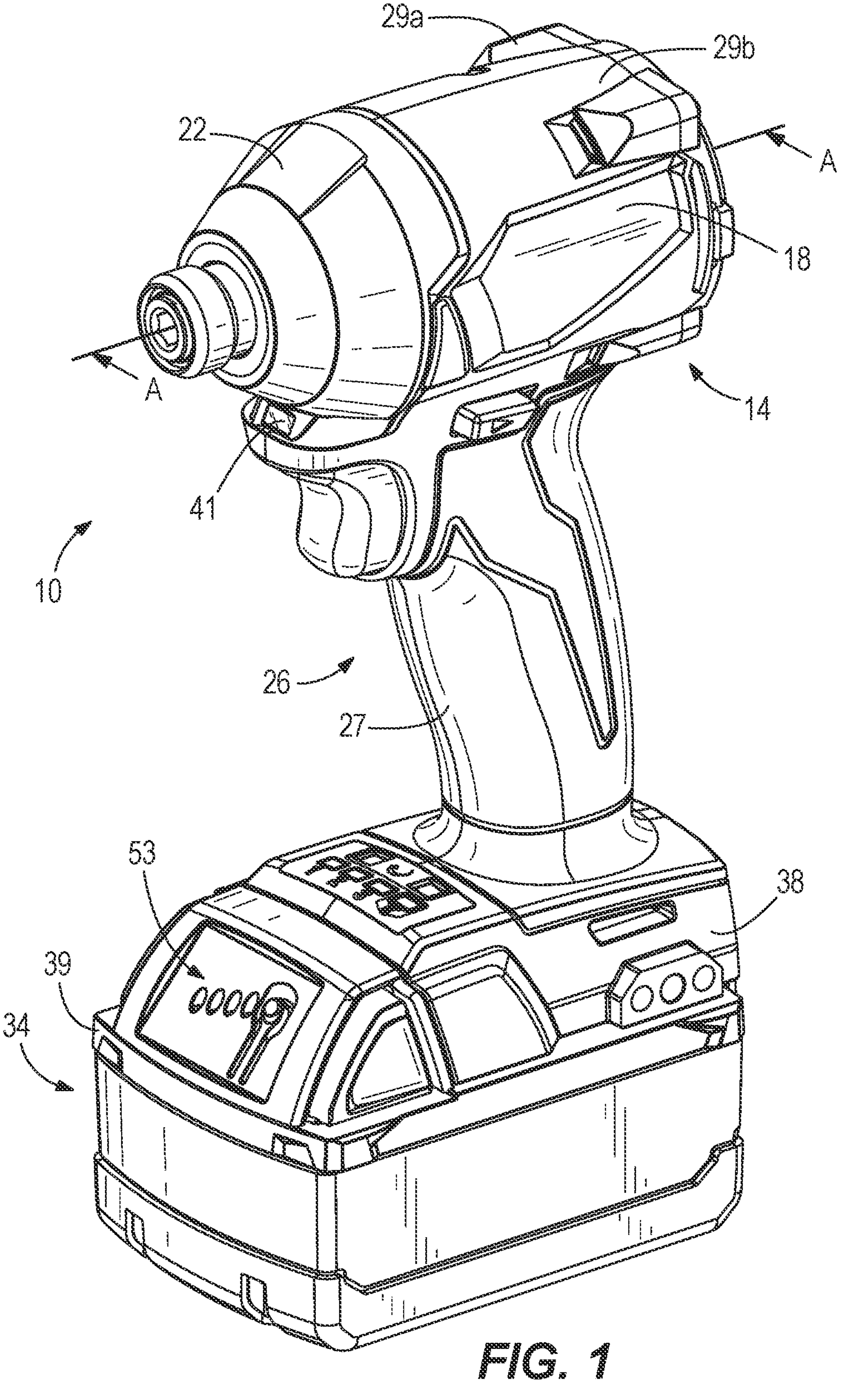
FIG. 1 is a perspective view of an impact tool according to some implementations of the present disclosure.

Before any exemplary implementations of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counterclockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the appended claims.

Impact tools, such as impact wrenches, include in some implementation quick-connect bit retainer assemblies along with an anvil that supports ball detents that fit into a groove formed in a connected tool bit. In desirable implementations, the retainer assembly includes a deformable retainer ring (e.g., a flexible ring, a rubber ring) placed about the anvil for biasing the ball detent(s) within slots formed in the side wall of the anvil. For example, when a tool bit is inserted into a drive bore of an anvil, the deformable retainer ring deforms to allow the ball detent(s) to move out of their slots in the side wall of the anvil, clearing the way for a shaft of the tool bit to be fully inserted into the drive bore. Once the tool bit is inserted, a retainer, such as an outer sleeve about the driving end portion of the anvil, prevents the ball detents from moving outwardly.

To remove an inserted tool element (e.g., a quick-connect tool bit), the outer sleeve is pulled toward the distal end (e.g., where an open end of the drive bore is exposed to receive a tool element) of the driving end portion to align a radial recess of the tool element shaft (e.g., a quick-connect tool bit) with the ball detent slots in the side wall of the anvil, allowing the ball detents to move outward and release the shaft of the tool bit.

Implementations for a tool using a deformable non-metal retainer ring can improve performance for a tool, such as an impact tool, by minimizing corrosion or failure that might be experienced with metal spring assemblies used for biasing ball detents.

FIG. 1 illustrates a rotary power tool in the form of an exemplary impact driver 10. The impact driver 10 includes a housing 14 with a motor housing portion 18, a front housing portion or gear case 22 coupled to the motor housing portion 18 (e.g., by a plurality of fasteners), and a handle portion 26 disposed underneath the motor housing portion 18. The handle portion 26 includes a grip 27 that can be grasped by a user operating the impact driver 10. In the illustrated embodiment, the handle portion 26 and the motor housing portion 18 are defined by cooperating clamshell halves 29*a*, 29*b*. In some embodiments, the clamshell halves 29*a*, 29*b* may also define at least a portion (e.g., a rear portion) of the gear case 22.

With continued reference to FIG. 1, the impact driver 10 has a battery pack 34 removably coupled to a battery receptacle 38 located at a bottom end of the handle portion 26. The battery pack 34 includes a housing 39 supporting battery cells 40 (FIG. 2), which are electrically connected to provide the desired output (e.g., nominal voltage, current capacity, etc.) of the battery pack 34. A battery power display 53 indicates the power level remaining in the battery pack 34 (FIG. 1). In other embodiments, the impact driver 10 may include a power cord for electrically connecting the impact driver 10 to a source of AC power. As a further alternative, the impact driver 10 may be configured to operate using a different power source (e.g., a pneumatic power source, etc.).

Figure 2A:
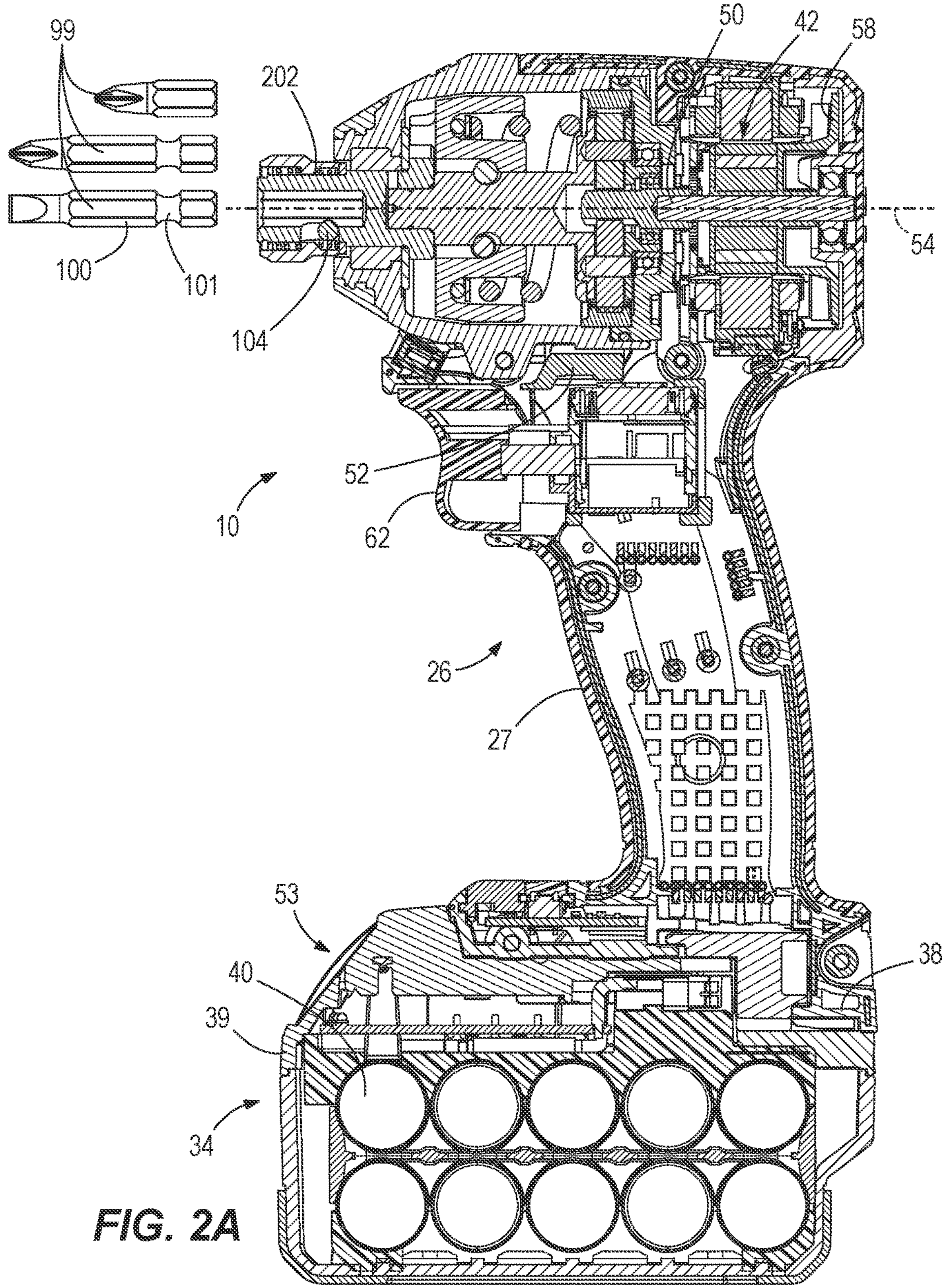
FIG. 2A is a cross-sectional view of the impact tool of FIG. 1, taken along line A-A in FIG. 1.

Referring to FIG. 2A, a motor 42, supported within the motor housing portion 18, receives power from the battery pack 34 when the battery pack 34 is coupled to the battery receptacle 38. In the illustrated embodiment, the motor 42 is a brushless direct current ("BLDC") electric motor having a stator 46 and a rotor or drive shaft 50. A button 52, extending laterally from the housing 14, allows an operator to change the direction that the motor 42 rotates the drive shaft 50 that is rotatable about an axis 54 relative to the stator 46. In other embodiments, other types of motors may be used. A fan 58 is coupled to the drive shaft 50 (e.g., via a splined connection) behind the motor 42.

The impact driver 10 also includes a switch 62 (e.g., trigger switch) supported by the housing 14 for operating the motor 42 via suitable control circuitry provided on one or more printed circuit board assemblies ("PCBAs") that control power supply and command of the motor 42. In other embodiments, the impact driver 10 may include a power cord for connecting to a source of AC power. As a further alternative, the impact driver 10 may be configured to operate using a non-electrical power source (e.g., a pneumatic or hydraulic power source, etc.). In some embodiments, the switch 62 that is coupled to the handle portion 26 and actuatable to selectively electrically connect the motor 42 and the battery pack 34 to provide DC power to the motor 42.

Figure 2B:
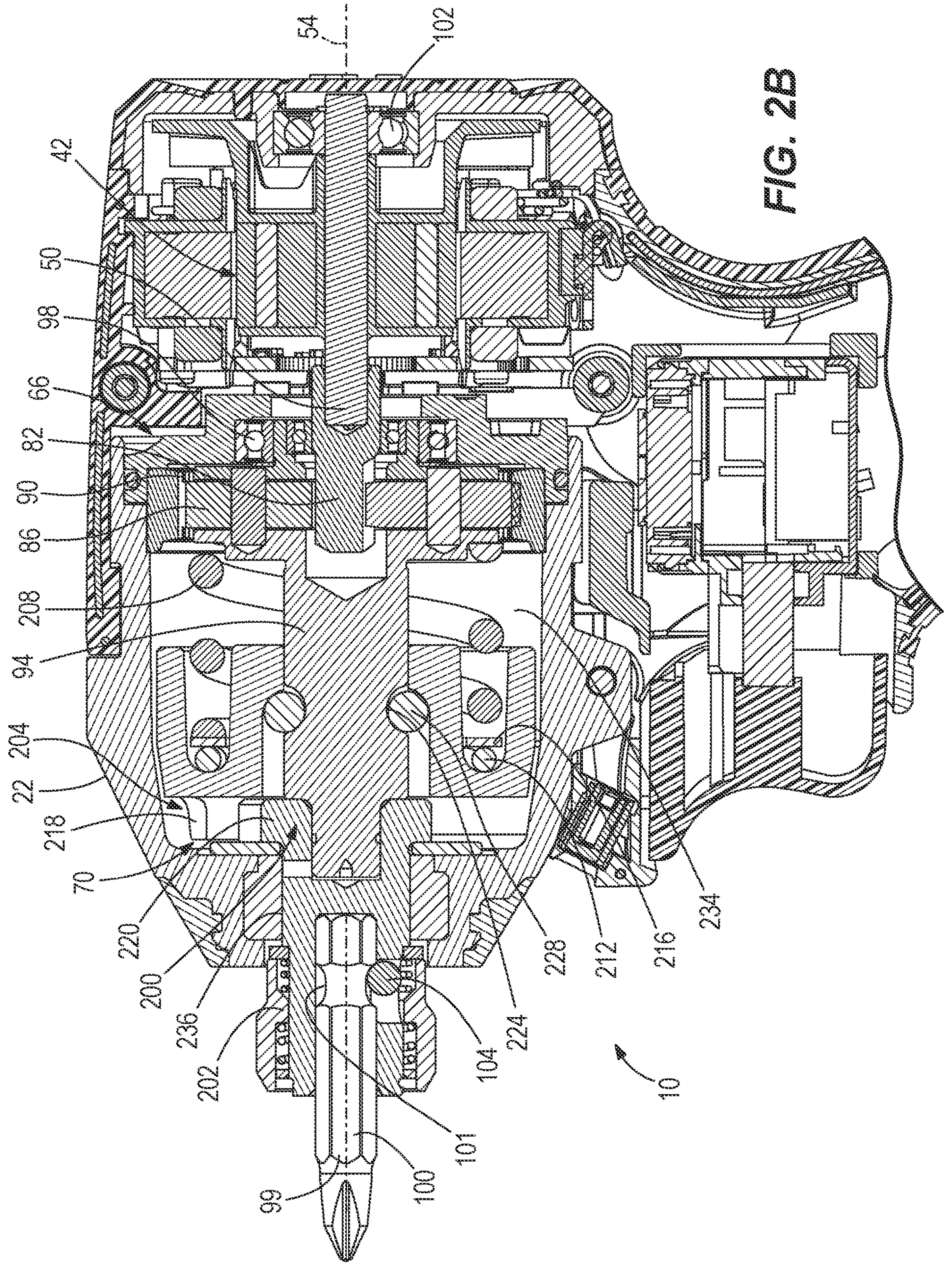
FIG. 2B is an enlarged cross-sectional view of a portion of the impact tool illustrated in FIG. 2.

With reference to FIG. 2B, the impact driver 10 further includes a gear assembly 66 coupled to the drive shaft 50 and a drive assembly or impact assembly 70 coupled to an output of the gear assembly 66. The gear assembly 66 is at least partially housed within the gear case 22. The gear assembly 66 may be configured in any of a number of different ways to provide a speed reduction between the drive shaft 50 and an input of the drive assembly 70.

Referring to FIGS. 2A-B, the gear assembly 66 includes a pinion 82 formed (e.g., hobbed), pressed, or otherwise coupled for co-rotation with the drive shaft 50, a plurality of planet gears 86 meshed with the pinion 82, and a ring gear 90 meshed with the planet gears 86 and rotationally fixed within the gear case 22. The planet gears 86 are mounted on a camshaft 94 of the drive assembly 70 such that the camshaft 94 acts as a planet carrier. Accordingly, rotation of the drive shaft 50 rotates the planet gears 86, which then orbit along the inner circumference of the ring gear 90 and thereby rotate the camshaft 94. The gear assembly 66 thus provides a gear reduction ratio from the drive shaft 50 to the camshaft 94. The drive shaft 50 is rotatably supported by a first or forward bearing 98 and a second or rear bearing 102.

The drive assembly 70 of the impact driver 10 includes an output shaft extending from the gear case 22 where the output shaft may in some implementations be in the form of an anvil 200. The anvil 200 (e.g., one type of output shaft) and/or drive assembly 70 includes a bit holder or retainer 202 configured to support a tool element 99 (e.g., a screwdriver bit, drill bit, a quick-connect tool bit, etc.), which can be retained and driven by the anvil 200 to perform work on a workpiece (e.g., a fastener, plank, etc.). The tool element 99 may also be referred to as a tool bit and/or driver bit. With specific reference to FIG. 2, the tool element 99 may have a hexagonal (e.g., cross-section) body or shank 100 with a groove 101, such as a power groove, formed in a portion of the shank 100, though other similar body shapes are contemplated. As described in greater detail below, the groove 101 may be configured to receive one or more ball detents 104 to inhibit removal of the tool element 99 from the retainer 202.

In some implementations, the drive assembly 70 is configured to convert the continuous rotational force or torque provided by the motor 42 and gear assembly 66 to a striking rotational force or intermittent applications of torque to the anvil 200 when the reaction torque on the anvil 200 (e.g., due to engagement between the tool element 99 and a fastener being worked upon) exceeds a certain threshold. In the illustrated exemplary embodiment of the impact driver 10, the drive assembly 70 includes the camshaft 94, a hammer 204 supported on and axially slidable relative to the camshaft 94, and the anvil 200.

The drive assembly 70 further includes a spring 208 biasing the hammer 204 toward the front of the impact driver 10 (i.e., toward the left in FIG. 2B). In other words, the spring 208 biases the hammer 204 in an axial direction toward the anvil 200, along the axis 54. A thrust bearing 212 and a thrust washer 216 are positioned between the spring 208 and the hammer 204. The thrust bearing 212 and the thrust washer 216 allow for the spring 208 and the camshaft 94 to continue to rotate relative to the hammer 204 after each impact strike when hammer lugs 218 on the hammer 204 engage with corresponding anvil lugs 220 and rotation of the hammer 204 momentarily stops. A washer may be located between the anvil 200 and a front end of the gear case 22 in some embodiments. The camshaft 94 further includes cam grooves 224 in which corresponding cam balls 228 are received. The cam balls 228 are in driving engagement with the hammer 204 and movement of the cam balls 228 within the cam grooves 224 allows for relative axial movement of the hammer 204 along the camshaft 94 when the hammer lugs 218 and the anvil lugs 220 are engaged and the camshaft 94 continues to rotate.

Referring still to FIGS. 1-2B, the anvil 200 (e.g., one exemplary type of an output shaft) is rotatably supported by a bushing 236 fixed within a front portion of the gear case 22. In the illustrated embodiment, the bushing 236 is made of powdered metal. During operation of the impact driver 10, an operator depresses the switch 62 to activate the motor 42, which continuously drives the gear assembly 66 and the camshaft 94 via the drive shaft 50. As the camshaft 94 rotates, the cam balls 228 drive the hammer 204 to co-rotate with the camshaft 94, and the hammer lugs 218 engage driven surfaces of the anvil lugs 220 to provide an impact and to rotatably drive the anvil 200 and the tool element 99.

After each impact, the hammer 204 moves or slides rearward along the camshaft 94, away from the anvil 200, so that the hammer lugs 218 disengage the anvil lugs 220. As the hammer 204 moves rearward, the cam balls 228 situated in the respective cam grooves 224 in the camshaft 94 move rearward in the cam grooves 224. The spring 208 stores some of the rearward energy of the hammer 204 to provide a return mechanism for the hammer 204. After the hammer lugs 218 disengage the respective anvil lugs 220, the hammer 204 continues to rotate and moves or slides forwardly, toward the anvil 200, as the spring 208 releases its stored energy, until the drive surfaces of the hammer lugs 218 re-engage the driven surfaces of the anvil lugs 220 to cause another impact.

Although the anvil 200 described above in the context of FIGS. 1-2B is with reference to the impact driver 10, the anvil 200 may be incorporated into other rotary impact tools. Furthermore, features of the anvil 200, and particularly tool element retaining features of the anvil 200 described in greater detail below, may be incorporated into other fastener driver tools, such as ratchet wrenches, socket-driving adapters for drills, and the like.

Referring now to FIGS. 3A to 6, an implementation of a driving end portion 322 of an anvil 398 for a tool element retaining assembly 300 is described. The anvil 398 and tool element retaining assembly 300 may be incorporated into an impact driver 10, such as the impact driver 10 described above (e.g., as the anvil 200 and bit retainer 202), or into other rotary impact tools, as also described above.

Figures 3A, 3B:
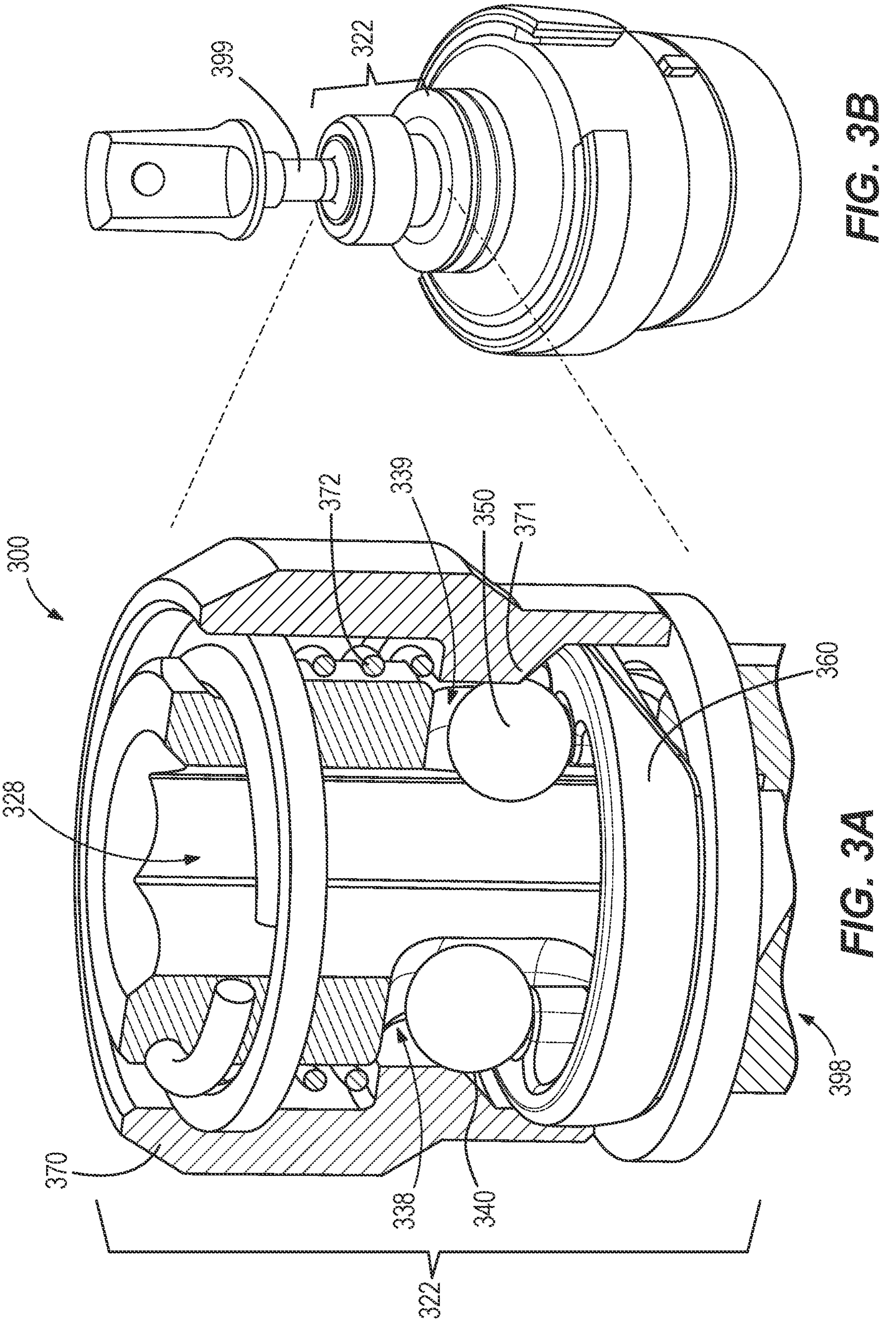
FIG. 3A is a partial cross-sectional perspective view of an exemplary anvil and retainer assembly at a driving end portion of the anvil configured to receive a tool bit, according to some implementations of the present disclosure.
FIG. 3B is a perspective view of a tool bit inserted into the anvil of FIG. 3A, according to some implementations of the present disclosure.

Referring to FIGS. 3A and 3B, the anvil 398 includes an impact receiving portion (not shown) and a driving end portion 322 opposite the impact receiving portion. The driving end portion 322 of the anvil 398 is depicted with a generally circular cross-sectional shape that receives, for example, a driving tool bit 399. In some implementations, the driving end portion of an anvil include a generally square cross-sectional shape, such as for tool element that drives a socket.

The driving end portion 322 in FIG. 3A is configured to receive a tool bit 399 within a drive bore 328 fabricated into the anvil 398. The drive bore 328 can be hexagonal in shape as depicted in the partial cross-sectional view of the anvil 398 in FIG. 3A. The drive bore 328 extends into and along a longitudinal axis 54 (see FIGS. 2A-2B) of the driving end portion 322. The drive bore 328 extends along the axis 54 (FIGS. 2A-B) so that that the tool bit 399 is coupled for co-rotation with the anvil 398. Other complimentary polygonal (e.g., square, star, etc.) or splined shapes are contemplated for the drive bore 328 to allow driving engagement between the drive bore 328 and the tool bit 399 during operation of a driver tool. For example, the drive bore 328 may be shaped and sized to correspond to the shape and size of the tool bit 399 to couple the tool bit 399 for co-rotation with the anvil 398.

The tool bit 399 may be retained in the drive bore 328 of anvil 398 in different ways. For example, referring to FIG. 3A, the illustrated driving end portion 322 includes a plurality of ball detents 340, 350 that are respectively positioned to extend into the drive bore 328 at two transverse perimeter slots 338, 339 into side walls of the anvil 398. The slots 338, 339 are on opposite side walls at the driving end portion 322 of the anvil 398.

With continued reference to FIG. 3A, the retaining assembly 300 includes a collar 370 surrounding the driving end portion 322 of the anvil 398. The collar 370 is movable between a locked position (illustrated in FIG. 3A) and an unlocked position (not shown). In the locked position, an internal shoulder 371 of the collar 370 is aligned with the slots 338, 339 and is engageable with the detent balls 340, 350 to prevent the detent balls 340, 350 from moving radially outward. When the bit 399 is received in the drive bore 328, the balls 340, 350 are thus retained within a groove in the bit 399 to prevent the bit 399 from being axially withdrawn from the drive bore 328. In the unlocked position, the collar 370 is pulled forward, until a recess adjacent the shoulder 371 is aligned with the slots 338, 339, permitting the detent balls 340, 350 to move radially outwardly and out of engagement with the groove in the tool bit 399. In the illustrated embodiment, the collar 370 is biased toward the locked position by a spring 372 (e.g., a coil spring).

Figure 4:
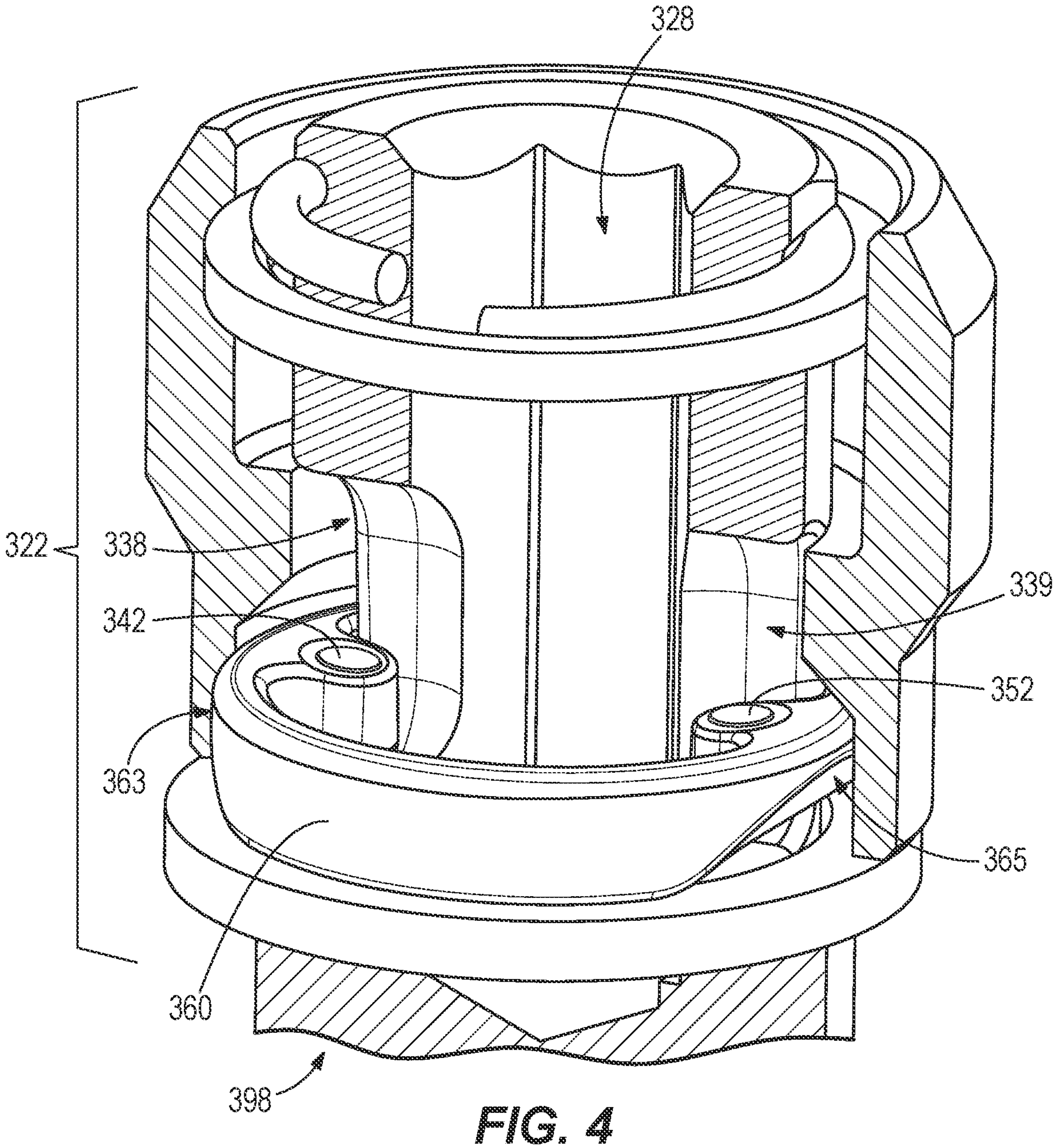
FIG. 4 is the partial cross-sectional perspective view of FIG. 3A depicting a deformable retainer ring with the ball detents removed, according to some implementation of the present disclosure.

The ball detents 340, 350 are seated in ball detent seats 342, 352 (e.g., cup-shaped recesses) located on deformable wings 363, 365 of a retainer ring 360 (FIG. 4). The ring 360 is preferably made of a deformable material (e.g., an elastomer) and extends around the circumference of an exterior surface of the driving end portion 322 of the anvil 398. The ball detent seats 342, 352 in the deformable wings 363, 365 protrude inwardly toward the drive bore 328 through the respective transverse perimeter slots 338, 339.

Figure 5:
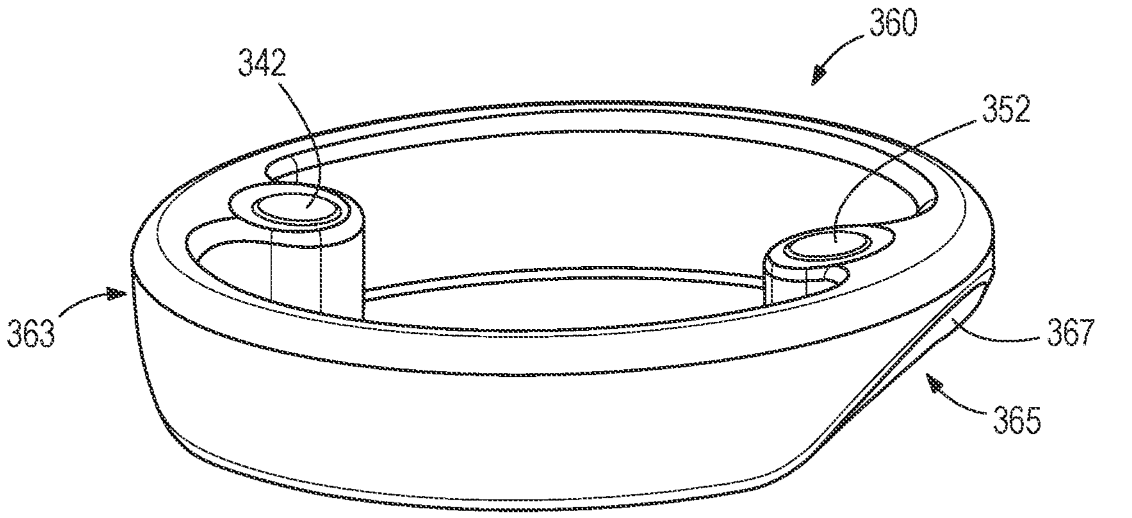
FIG. 5 is a perspective view of the deformable retainer ring of FIGS. 3A and 4 including two ball detent seats, according to some implementations of the present disclosure.

Referring to FIG. 5, in the illustrated embodiment, the deformable wings 363, 365 have a reduced thickness relative to the remaining portions of the retainer ring 360. More specifically, in the region of each wing 363, 367, an outer surface 367 of the ring 360 tapers inwardly at an oblique angle from a front side of the ring 360 (e.g., the side having the ball detent seats 342, 352) toward a rear side of the ring 360. The reduced thickness of the ring 360 in the region of each wing 363, 367 allows the wings 363, 375 to pivot relative to the body of the ring 360 during insertion of the tool bit 399, as described in greater detail below.

Figure 6:
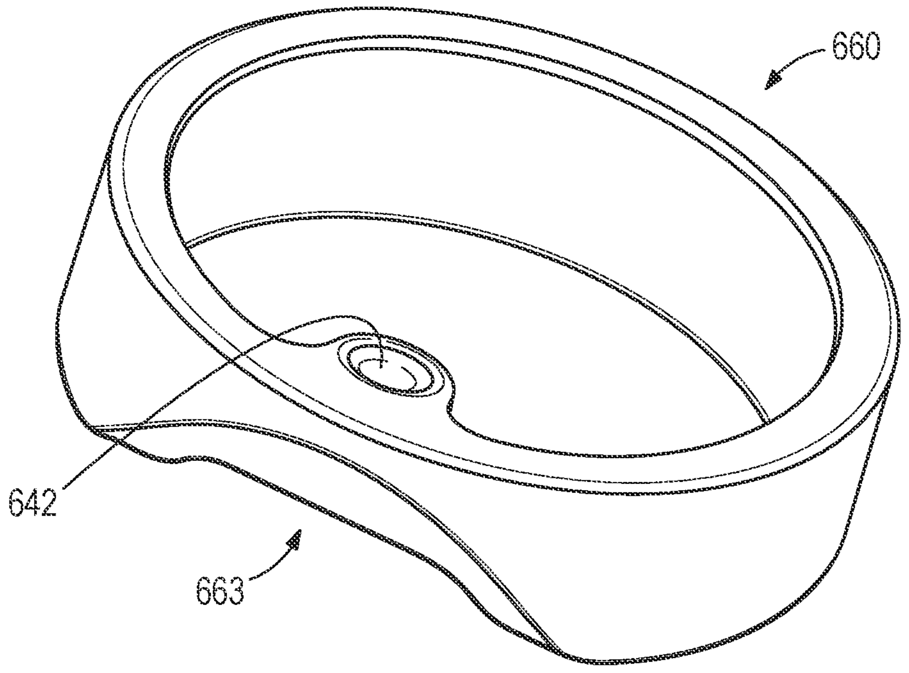
FIG. 6 is a perspective view of another deformable ring including a single ball seat, according to some implementations of the present disclosure.

In the embodiment illustrated in FIGS. 3A-5, as well as other embodiments including a plurality of ball detents, the ball detents may be evenly positioned about the perimeter of the anvil 398. For example, if two ball detents are used, such as illustrated in FIG. 3A, the ball detents are positioned 180 degrees from each other about the perimeter surface of the anvil at the driving end portion. As another example, where three ball detents are used, the ball detents are positioned 120 degrees from each other about the perimeter of the anvil at the driving end portion. Yet other implementations may include only one ball detent. For example, FIG. 6 illustrates another deformable retainer ring 660 similar to deformable retainer ring 360, except with a single deformable wing 663 and a ball detent seat 642.

In use, when the tool bit 399 is inserted into the drive bore 328, the rear end of the tool bit 399 engages the ball detents 340, 350 but does not force a sleeve 370 of the retaining assembly to move along the longitudinal axis (e.g., axis 54 in FIG. 1) of the drive bore 328. Rather, during insertion of the tool bit 399 into the drive bore 328 at the driving end portion 322, the deformable wings 363, 365 of the deformable retainer ring 360 deflect and cause the ball detents 340, 350 to move within the slots 338, 339 outwardly away from the drive bore 328 to allow the tool bit 399 to slide past the ball detents 340, 350. Once the groove of the tool bit 399 is aligned with the position of the ball detents, the ball detents 340, 350 return to their position to hold the tool bit 399 in place. To release the tool bit 399, the outer sleeve 370 is pulled axially to the unlocked position, which allows the ball detents 340, 350 to move outwardly away from the drive bore 328 and disengage the groove. This allows the tool bit 399 to be released and removed from the drive bore 328.

In some implementations, an impact tool includes a housing, a motor supported within the housing, and an anvil extending from the housing. The anvil includes a body rotatable about a longitudinal axis, a driving end portion including a retainer assembly, such as a sleeve, positioned around the outer surface of the driving end portion of the anvil. The driving end portion includes a drive bore extending from the distal end of the anvil along the longitudinal axis of the driving end portion. The drive bore is configured to receive a tool bit. A deformable retainer ring is positioned about the outer surface of the anvil in a space between an outer surface of the driving end portion and an interior surface of a proximal end of the retainer assembly, such as the sleeve. The deformable retainer ring is fabricated from a flexible, non-metal material. The deformable retainer ring includes one or more deformable wings having ball detent seats for seating ball detents. The ball detents seated on the deformable retainer spring allow the insertion and release of the tool bit when the deformable wings are in a deformed state. The ball detents seated on the deformable retainer spring further allow the retention of an inserted tool bit when the deformable wings are in a non-deformed state.

Although the invention has been described in detail with reference to certain preferred embodiments, variations and modifications exist within the scope and spirit of one or more independent aspects of the invention as described.

What is claimed is:

1. A tool comprising:

a housing;

an electric motor positioned in the housing;

a drive assembly including an output shaft having a driving end portion, the output shaft extending from the housing and including a drive bore configured such that a tool element for performing work on a workpiece is attachable to the output shaft by inserting the tool element into the drive bore;

a retainer assembly including a collar positioned about an outer surface of the driving end portion; and a deformable retainer ring including a flexible non-metal material, the deformable retainer ring positioned between the output shaft and the collar, wherein the deformable retainer ring includes a deformable wing having a ball detent seat receiving a ball detent.

2. The tool of claim 1, wherein a portion of the deformable wing extends outwardly relative to the output shaft, and wherein another portion of the deformable wing includes the ball detent seat extending inwardly toward the output shaft.

3. The tool of claim 2, wherein the deformable wing is deformable in response to insertion of the tool element into the drive bore.

4. The tool of claim 2, wherein the output shaft includes a slot extending into the drive bore, wherein the deformable wing and the ball detent extend into the drive bore in an undeformed state of the deformable retainer ring, and wherein the deformable wing deflects to permit the ball detent to move out of the drive bore and into the slot when the deformable wing of the deformable retainer ring is in a deformed state.

5. The tool of claim 2, wherein the deformable wing is one of a plurality of deformable wings of the deformable retainer ring.

6. The tool of claim 5, wherein the ball detent is one of a plurality of ball detents, each associated with a respective one of the plurality of deformable wings.

7. The tool of claim 1, wherein the flexible non-metal material is rubber.

8. The tool of claim 1, wherein the output shaft is an anvil including a body rotatable about a longitudinal axis.

9. The tool of claim 8, wherein the collar is movable along the longitudinal axis.

10. The tool of claim 1, wherein the tool is an impact driver and the drive assembly is configured to convert a continuous rotational input from the electric motor to intermittent applications of torque to the output shaft, the drive assembly including a camshaft driven by the electric motor and a hammer configured to reciprocate along the camshaft.

11. A tool comprising:

a housing;

an electric motor positioned in the housing;

a drive assembly including an output shaft having a driving end portion, the output shaft extending from the housing and including a drive bore configured such that a tool element for performing work on a workpiece is attachable to the output shaft by inserting the tool element into the drive bore;

a retainer assembly including a collar positioned about an outer surface of the driving end portion; and a deformable retainer ring comprising:

a ring structure formed from a flexible non-metal material, the ring structure having an inner diameter configured to allow the ring structure to be positioned about an outer surface of the drive end portion of the output shaft;

a deformable wing positioned along a circumference of the ring structure; and a ball detent seat positioned on the deformable wing for receiving a ball detent.

12. The tool of claim 11, wherein ring structure is configured to be positioned between the outer surface of the driving end portion and an interior surface of a proximal end of a tool bit retainer sleeve.

13. The tool of claim 11, wherein the ball detent seat protrudes inwardly toward a center of the ring structure.

14. The tool of claim 13, wherein the ball detent seat protrudes inwardly through a transverse perimeter slot into a side wall of the output shaft when the ring structure is positioned about the outer surface of the driving end portion.

15. The tool of claim 11, wherein the ball detent seat includes a cup-shaped recess.

16. The tool of claim 11, wherein the ring structure includes an elastomer material.

17. The tool of claim 11, wherein the deformable wing has a reduced thickness relative to the thickness of a remaining portion of the ring structure, the reduced thickness allowing the deformable wing to pivot relative to the remaining portion of the ring structure.

18. The tool of claim 17, wherein an outer surface of the retainer ring tapers inwardly at an oblique angle from a front side of the ring structure toward a rear side of the ring structure.

* * * * *